United States Patent [19]

Das et al.

[11] Patent Number: 4,692,503
[45] Date of Patent: Sep. 8, 1987

[54] COATING COMPOSITIONS COMPRISING FREE RADICAL ADDITION POLYMERS WITH CROSSLINKABLE INTEGRAL ISOCYANATO GROUPS

[75] Inventors: Suryya K. Das, Pittsburgh; Charles M. Kania, Tarentum, both of Pa.

[73] Assignee: PPG Industries, Inc., Pittsburgh, Pa.

[21] Appl. No.: 493,045

[22] Filed: May 13, 1983

Related U.S. Application Data

[63] Continuation of Ser. No. 220,620, Dec. 29, 1980, abandoned.

[51] Int. Cl.[4] ............................................. C08F 12/26
[52] U.S. Cl. ..................................... 526/301; 526/263
[58] Field of Search ................................ 526/263, 301

[56] References Cited

U.S. PATENT DOCUMENTS

| | | | |
|---|---|---|---|
| 3,299,007 | 1/1967 | Suling et al. | 260/77.5 |
| 3,867,347 | 2/1975 | Felber et al. | 526/301 |
| 3,883,483 | 5/1975 | Anderson et al. | 260/77.5 TB |
| 3,939,051 | 2/1976 | Anderson et al. | 204/181 |
| 4,085,161 | 4/1978 | Sekmakas et al. | 260/837 R |
| 4,177,178 | 12/1979 | Das et al. | 260/29.40 A |
| 4,219,632 | 8/1980 | Simms | 526/218 |
| 4,267,295 | 5/1981 | Gallop et al. | 526/301 |
| 4,310,398 | 1/1982 | Gimpel et al. | 526/304 |

FOREIGN PATENT DOCUMENTS

| | | |
|---|---|---|
| 78100156.5 | 1/1979 | European Pat. Off. |
| 2924756 | 1/1981 | Fed. Rep. of Germany |
| 2924786 | 1/1981 | Fed. Rep. of Germany |

OTHER PUBLICATIONS

The Dow Chemical Company technical data revised 12/7/78, Developmental Products.
"Polymers with Pendant Isocyanate Gruops. I. Dual Synthesis and Properties of Poly(styrene-co-Styryl Isocyanate)" by Liebersohn and Kohn, Journal of Applied Polymer Science, vol. 20, (1976), pp. 411-420.

Primary Examiner—Joseph L. Schofer
Assistant Examiner—Angela L. Fugo
Attorney, Agent, or Firm—Godfried R. Akorli

[57] ABSTRACT

The invention provides non-gelled polymers containing integral isocyanato groups, which can be formulated into coating compositions. The polymers are derived preferably from polymerizable, ethylenically unsaturated blocked mono-isocyanato group-containing monomer, hydroxyl group-containing monomer and an amino group-containing monomer and/or carboxyl group-containing monomer. The coating compositions, particularly the electrodepositable compositions of this invention, possess excellent properties of wet appearance, substrate adhesion, hardness, chemical resistance and glossy appearance.

2 Claims, No Drawings

COATING COMPOSITIONS COMPRISING FREE RADICAL ADDITION POLYMERS WITH CROSSLINKABLE INTEGRAL ISOCYANATO GROUPS

This application is a continuation of application U.S. patent application Ser. No. 220,620, filed Dec. 29, 1980, now abandoned.

BACKGROUND OF THE INVENTION

1. Field of the Invention

The present invention relates to addition interpolymers containing blocked isocyanates. More specifically, it relates to curable coating compositions comprising acrylic polymers containing blocked isocyanates.

1. Brief Description of the Prior Art

Coating compositions comprising acrylic polymers and blocked isocyanate curing agents are known in the art. The polymers, generally, contain active hydrogens, such as hydroxyl groups. The blocked isocyanates are stable at ambient temperatures but unblock at higher temperatures to bring about a crosslinking or curing reaction.

Examples of prior art are U.S. Pat. Nos. 4,177,178 and 3,939,051. For example, U.S. Pat. No. 4,177,178 discloses aqueous thermosetting resinous compositions comprising acrylic polymers containing active hydrogens and fully blocked diisocyanate curing agents. U.S. Pat. No. 3,939,051 discloses cationic electrodepositable coating compositions comprising a copolymer derived from monomers, at least one of which is a reaction product of a diisocyanate of which one of the isocyanato groups is "half-blocked" by reacting it with an ethylenically unsaturated hydroxyl-containing monomer followed by "fully-blocking" by reacting the other isocyanato group with a saturated alcohol. Although cured films obtained from these coating compositions exhibit desirable properties of hardness and solvent resistance, the coating compositions, for one reason or the other, do have some of the following disadvantages.

In coating compositions such as described in U.S. Pat. No. 4,177,178, the fully blocked polyisocyanates do not constitute an integral part of the film former. There may, therefore, be a differential in rate of migration of the film former and the blocked diisocyanates toward a workpiece that is being coated. A disproportionate migration of the blocked diisocyanates would adversely affect cure. In view of the foregoing, polymers with integral isocyanates have been formulated. The formulation of polymers with integral isocyanates, such as disclosed in U.S. Pat. No. 3,939,051, however, presents problems affecting the preparation and stability of the intended polymer.

Of concern, here, are problems attendant upon the use of blocked polyisocyanato monomers in preparing addition interpolymers, particularly acrylic polymers containing integral isocyanato groups. It is believed that wherein the process for preparing these polymers involves a step of "half-blocking" a diisocyanate with a blocking agent such as an alcohol, the "half-blocking" reaction yields a mixture of "half-blocked", unblocked and fully blocked products. A portion of the unblocked diisocyanato products react with the hydroxyl-containing monomer to form diethylenically unsaturated moieties which may result in gelation during the polymer preparation. Further, if there is some unblocked product present and one of the monomers used in preparing the polymer is an active hydrogen group-containing monomer, premature gelation may also result.

The present invention overcomes this concern by providing nongelled polymers with integral isocyanato groups which avoid the aforementioned problems and which can be formulated into coating compositions.

SUMMARY OF THE INVENTION

In accordance with the foregoing, the present invention encompasses coating compositions comprising a polymer which is prepared by polymerizing under free radical polymerization conditions a mixture of monomers, said polymer comprising in the pendant groups:

(A) from about 0.2 to 6 percent by weight nitrogen in an amino group and/or from about 0.01 to 0.8 percent by weight hydrogen in an acid group;

(B) from about 0.3 to 7 percent by weight nitrogen in a blocked mono-isocyanato group; and (C) from about 0.4 to 15 percent by weight of a hydroxyl group.

The term "pendant" as used herein is intended to denote the groups attached to the polymer backbone.

Preferably, the polymer is prepared by polymerizing under free radical polymerization conditions a mixture of monomers comprising:

(A) from about 5 to about 50 percent by weight of a polymerizable ethylenically unsaturated amino group-containing monomer and/or a carboxyl group-containing monomer;

(B) from about 5 to 85 percent by weight of a polymerizable ethylenically unsaturated blocked monoisocyanate group-containing monomer;

(C) from about 5 to about 90 percent by weight of a polymerizable ethylenically unsaturated hydroxyl-containing monomer; and (D) from about 0 to 85 percent by weight of at least one polymerizable ethylenically unsaturated monomer different from (A), (B) and (C).

The blocked mono-isocyanato monomer is preferably an isocyanato alkyl ester of carboxylic acid such as 2-isocyanato alkyl ester exemplified by 2-isocyanato ethyl methacrylate.

The resultant polymers are ungelled and stable, and can be formulated without difficulty into coating compositions containing very effective amounts of isocyanato groups, for cure. Preferred herein are the water-based compositions of the polymers. The water-based compositions, particularly electrodepositable compositions comprising the dispersion of the instant polymers, possess excellent properties of good wet appearance, chemical resistance and substrate adhesion on a variety of substrates. When films formed thereby are baked at temperatures of about 400° F. (204° C.), they develop excellent properties of hardness, flexibility, and glossy appearance.

Accordingly, the present invention further encompasses the electrodepositable composition comprising the instant polymers, and the process for their electrodeposition on a variety of substrates, both treated and untreated.

DETAILED DESCRIPTION

The polymers of the present invention can be prepared by free radical initiated polymerization techniques such as solution or emulsion polymerization of a mixture of polymerizable ethylenically unsaturated monomers. The polymerizable monomers of the present invention are an ethylenically unsaturated amino group-containing monomer or an acid group-containing monomer; an ethylenically unsaturated blocked mono-isocyanato group-containing monomer; and an ethylenically unsaturated hydroxyl group-containing monomer. At least one other ethylenically unsaturated monomer which is different from the above monomers can, optionally, be polymerized with the above.

Illustrative of the amino group-containing monomers are acrylate and/or methacrylate esters, preferably having from 1 to 6 carbon atoms in the alkyl radical, such as the aminoethyl, aminopropyl, and aminohexyl esters; mono-N,N-di ($C_1$–$C_4$alkyl-amino) - ($C_1$–$C_6$ alkyl) esters, such as mono-(N,N-dimethylamino)ethyl ester and mono-(N,N-dimethylamino)hexyl ester. Also useful are monocyclic or bicyclic compounds having a five-membered to six-membered heterocyclic ring containing one to three, preferably one to two heteroatoms, and should have at least one basic nitrogen atom and one heteroatom which is a nitrogen atom bearing a vinyl group. The basic nitrogen atom and the nitrogen atom bearing a vinyl group may be one and the same group. Particularly suitable monocyclic or bicyclic compounds are those which contain no heteroatoms other than nitrogen and for the rest consist of hydrocarbon radicals having not more than 20 carbon atoms. Examples of useful monocyclic compounds are N-vinylpyrazole, N-vinylimidazole, N-vinylimidazoline, N-vinylpiperidine and analogous compounds which bear methyl, ethyl or propyl groups as substituents on carbon atoms in the ring. Another amino group-containing monomer which can be used herein is an aziridinyl acrylate or methacrylate.

Also, in some instances, ethylenically unsaturated primary amino group-containing monomers such as the hydrochloride salt of aminoethyl methacrylate may be useful. However, for purposes of this invention monomers such as N,N-dimethylaminoethyl methacrylate, N-vinylimidazole and the like are preferred.

The acid group-containing monomer is a carboxylic acid, phosphonic acid or sulfonic acid. Illustrative of the carboxylic acids are acrylic acid, methacrylic acid, crotonic acid, fumaric acid, maleic acid and itaconic acid. Illustrative of the phosphonic acids are phosphoethyl acrylate or methacrylate. Illustrative of the sulfonic acids are sulfoethyl methacrylate, acryloimidomethylpropane sulfonic acid and the like.

Illustrative of the mono-isocyanato group-containing monomers are isocyanato alkyl esters of an ethylenically unsaturated carboxylic acid, vinyl isocyanates, propenyl isocyanates, isopropenyl isocyanates, 9-decenyl isocyanates, β-allyloxyalkyl isocyanates, isocyanatoalkylacrylamide and styryl isocyanates. The preferred mono-isocyanato monomers are the isocyanatoalkyl esters of ethylenically unsaturated carboxylic acid such as 2-isocyanato ethyl methacrylate. These mono-isocyanato monomers and their methods of preparation are known in the art. They can be prepared by some of the methods referred to in the *Journal of Applied Polymer Science,* Vol. 20, pages 411–420 (1976).

As set forth hereinbefore, the mono-isocyanato monomer is blocked before it is polymerized. The mono-isocyanato monomer is blocked by reacting it with compounds so that the resultant blocked mono-isocyanato monomer is stable to hydroxyl or amine groups at room temperatures and at temperatures of the polymerization. At elevated cure temperatures, usually between about 200° F. (93° C.) and about 600° F. (316° C.), the blocked mono-isocyanato group unblocks and reacts with the hydroxyl or amino group of the polymer.

Any suitable aliphatic, cycloaliphatic, aromatic, alkyl mono-alcohol or phenolic compound may be used as a blocking agent in accordance with the present invention, such as, for example, lower aliphatic alcohols, such as methyl, ethyl, chloroethyl, propyl, butyl, hexyl, octyl, and nonyl alcohols; the aromatic alkyl alcohols, such as phenylcarbinol, methylphenylcarbinol, ethylene glycol monoethyl ether, ethylene glycol monobutyl ether and the like; the phenolic compounds such as phenol itself, substituted phenols in which the substituents do not adversely affect the coating operations. Examples include cresol and xylenol. Minor amounts of even higher molecular weight, relatively non-volatile monoalcohols may be used, if desired, to serve as plasticizers in the coatings provided by this invention.

Additional blocking agents include tertiary amino alcohols such as diethylethanolamine; oximes such as methyl ethyl ketone oxime; and lactams such as epsilon-caprolactam. The blocking agents that are preferred in the invention are alcohols.

The blocking agent may be added in any quantity. However, the equivalence ratio of the blocking agent to mono-isocyanato monomer is generally equal to or greater than 1:1.

The blocking reaction is conducted over a temperature range of about 25 to 100° C., and preferably from about 80° to 90° C. Sometimes, the blocking reaction is conducted in the presence of a catalyst. Examples of catalyst which may be used are dibutyltin diacetate, dibutyltin dilaurate, triethylenediamine, triethylamine, and the like. The catalyst comprises from about 0.01 percent to about 5 percent by weight of the reactants.

In the blocking reaction, a free-radical inhibitor such as hydroquinone is also used to prevent the reactant from polymerizing.

The hydroxyl group-containing monomer useful herein can be illustrated by hydroxyalkyl acrylates or methacrylates in which the hydroxyalkyl group preferably contains from 2 to 4 carbon atoms such as hydroxyethyl acrylate, hydroxyethyl methacrylate, hydroxypropyl acrylate and hydroxypropyl methacrylate.

The other ethylenically unsaturated monomers may be any monomer containing a $CH_2=C<$ group. The selection of a particular monomer and the amount thereof would depend on cost and the intended properties of the resultant polymer. Illustrative of these monomers are:

1. mono-olefinic hydrocarbons, that is, monomers containing only atoms of hydrogen and carbon, such as styrene, alpha-methylstyrene, and vinyltoluene;

2. halogenated mono-olefinic hydrocarbons, that is, monomers containing carbon, hydrogen, and one or more halogen atoms such as alpha-chlorostyrene and alpha-bromostyrene;

3. esters of organic and inorganic acids such as vinyl acetate, vinyl p-chlorobenzoate, vinyl p-methoxybenzoate, methyl methacrylate, ethyl methacrylate, butyl methacrylate, methyl crotonate, methyl acrylate, ethyl acrylate, butyl acrylate, 2-ethylhexyl acrylate, isopropenyl acetate, methyl alpha-chloroacrylate, and dimethyl maleate;

4. organic nitriles such as acrylonitrile and methacrylonitrile;

5. monomeric ketones such as isopropenyl methyl ketone and vinyl methyl ketone;

6. aldehydes such as acrolein and methacrolein.

In general, it is preferred that the monomer utilized contain a single $CH_2=C<$ group, which group is activated by a negative substituent, and an especially preferred group of monomers includes ethyl acrylate, methyl methacrylate, butyl acrylate, ethylhexyl acrylate, and styrene.

The polymers can be prepared by solution or emulsion polymerization techniques.

Solution polymerization of the monomers can be most readily carried out in a solvent in which the monomers are soluble at reaction temperature and under reflux temperature. Various suitable solvents are toluene, xylene, higher boiling aromatic compounds; esters such as cellosolve acetate, isobutyl isobutyrate, and the like.

For water-based compositions, water-miscible solvents are used in the polymerization. Examples include the monoalkyl ethers of ethylene glycol which contain from 1 to 4 carbon atoms in the alkyl group such as ethylene glycol monoethyl ether and ethylene glycol monobutyl ether. Examples of other suitable water-miscible solvents are isopropanol and diacetone alcohol. Mixtures of solvents including mixtures of water-miscible solvents with water can also be used.

In carrying out the polymerization reaction, a free radical initiator is used. Examples of free radical initiators are those which are soluble in the polymerization medium such as azobisisobutyronitrile, azobis(alpha, gamma-dimethylvaleronitrile), tertiary-butyl perbenzoate, tertiary-butyl peracetate and benzoyl peroxide.

The quantity of catalyst employed can be varied considerably; however, in most instances it is desirable to utilize from about 0.1 percent to 5.0 percent by weight of the monomeric components.

Optionally, chain transfer agents such as alkyl mercaptans such as tertiary-dodecylmercaptan; ketones such as methyl ethyl ketone; chlorohydrocarbons such as chloroform can be used.

The polymerization is best carried out by admixing the monomers, the catalyst and chain-modifying agent, if any, in the solvent, and refluxing the resulting solution for a time sufficient to obtain the desired conversion. Ordinarily, the polymerization time will be from about 1 hour to about 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization because of the very rapid reaction rate. Good agitation is also desirable.

The polymers prepared by the above and other free radical polymerization techniques would have present therein the acid, hydroxyl, amino, and blocked mono-isocyanato functional group. Accordingly, the polymers of this invention are characterized as having a blocked mono-isocyanato functional group, a hydroxyl functional group, an amino functional group and/or an acid functional group. With regard to the hydroxyl, amino and acid functional groups, however, it is desired to point out that these functional groups can be introduced into the polymer by alternate methods. For example, a hydroxyl group can be so introduced by post-reacting some carboxyl functional group with ethylene oxide. This and other methods of introducing the functional groups into the polymer are intended to be covered in this context.

In an embodiment of the invention, the polymers, prepared by the solution polymerization technique, are formulated into coating compositions. In a preferred embodiment, the polymers are solubilized (i.e., at least partially neutralized) with an acid or a base to provide compositions that are dispersible in an aqueous medium to form water-based coating compositions.

Non-limiting examples of suitable inorganic acids which are used in neutralizing the polymers are phosphorous, sulfur and boron based acids. Non-limiting examples of suitable organic acids which are used in neutralizing the polymers are formic, acetic, propionic, glycolic, lactic and methane sulfonic acids.

The amount of acid which is used to solubilize the polymer will vary from about 25 to about 100 percent of the total theoretical neutralization. However, the preferred degree of neutralization is from about 75 to about 100 percent. Usually, the pH of the final aqueous dispersion is about 3 to 7.

The polymers which contain acid groups are at least partially neutralized with a base such as an alkali metal hydroxide (e.g., NaOH), ammonia or preferably with an organic amine.

Suitable amines are water-soluble amines including primary, secondary and tertiary amines including amino alcohols. Examples include ethanolamine, diethanolamine, N-methylethanolamine, dimethylethanolamine, methylamine, ethylamine, diethylamine, trimethylamine, triethylamine, morpholine and ammonia. The polymer is neutralized to the extent of at least about 25 percent of the total theoretical neutralization and usually between about 40 to 70 percent of the total theoretical neutralization. Usually the pH of the final aqueous dispersion is adjusted to about 7 to 9.

A polymer containing both acid and amino groups is amphoteric and can be neutralized with either a base or an acid as is desired. The base or acid is the same as described above for the neutralization of the above carboxyl- or amino group-containing acrylic polymers.

As set forth hereinabove, the instant polymers can be prepared by other art-known techniques. For example, the instant polymers can be prepared by aqueous emulsion polymerization techniques as described in U.S. Pat. No. 4,140,836, herein incorporated by reference. Another embodiment of this invention, therefore, encompasses aqueous emulsion polymers formulated into coating compositions. The coating compositions comprising the emulsion polymers are in the main applied by conventional methods. In yet another embodiment, the coating compositions of this invention comprise polymers prepared by non-aqueous polymerization techniques as described in U.S. Pat. No. 3,966,667, column 5, line 37, to column 7, line 49, incorporated herein by reference. The polymerizable monomers should, of course, be such as provides the instant polymers characterized by the afore-described functional groups.

The polymers of the present invention will preferably have a molecular weight on a weight average basis of at least 5000. Solution polymerized polymers will preferably have a molecular weight of 5000 to 100,000 on a weight average basis, and emulsion polymerized polymers will preferably have a molecular weight of 10,000 to several million on a weight average basis. The molecular weight being determined by gel permeation chromatography using a polystyrene standard.

When coating compositions of this invention are applied to suitable substrates, they may be cured at elevated temperatures, such as at about 400° F. (204° C.).

At these temperatures, it is believed that blocking agent is split from the isocyanate group, freeing the isocyanato groups to react with the hydroxyl groups of the polymer or other reactive groups. The blocking agent may either volatilize or remain in the composition as a plasticizer, depending essentially on its boiling point. Coating compositions of this invention can be applied by conventional means such as spraying, dipping, rolling or the like. Those compositions comprising aqueous dispersions of the polymer are, however, very well suited to electrodeposition, particularly cationic electrodeposition.

When the instant coating compositions are cathodically electrodeposited, films of excellent substrate adhesion and appearance are obtained. When baked, the films displayed excellent properties of hardness, flexibility, detergent and solvent resistance and glossy appearance. Thus, the cationic electrodepositable compositions and the process for their electrodeposition constitute a highly preferred embodiment of the invention.

In many instances, the coating compositions may be pigmented in desired proportions of most conventional type pigments, for example, iron oxide, lead oxide, carbon black, titanium dioxide, talc, barium sulfate, as well as color pigments such as cadmium red, phthalocyanine blue, toluidine red, chromic yellow, and the like. Various other additives that may be utilized include antioxidants, surface-active agents, fungicides, bactericides, wetting agents, anti-foaming agents, and the like.

Listed below are examples of the polymers and the coating compositions produced from the same. These examples are not to be construed as limiting the invention to their details. All parts and percentages in the examples, as well as throughout this specification, are by weight unless otherwise specified.

EXAMPLE I

This example illustrates blocking of mono-isocyanato ethyl methacrylate with 2-ethylhexanol.

The following were used in the preparation:

| Ingredients | Parts by Weight (in grams) |
|---|---|
| Reactor Charge | |
| Isocyanatoethyl methacrylate (ICEMA) | 77.5 |
| Styrene | 77.5 |
| Methyl ether of hydroquinone | 0.08 |
| Feed A | |
| 2-ethylhexanol | 68.25 |

The reactor charge, in a properly equipped vessel, was swept with a nitrogen blanket at 25° C. for about 10 minutes. Thereafter, Feed A was added over a period of one hour at a rate of 19.5 cc. per 15 minutes with the nitrogen atmosphere being maintained. After the addition of Feed A, the reaction mixture was held for one hour and then analyzed for the presence of unreacted isocyanate moieties. Upon finding that some of the isocyanato groups were unreacted, the reaction mixture was heated over the range of about 80°-85° °C. and one drop of dibutyltin dilaurate (0.0285 grams), catalyst, was added. The reaction mixture was held within this temperature range for about one hour. Thereafter, the mixture was analyzed by infrared spectroscopy and found to be free of unreacted isocyanato groups and to contain a 2-ethylhexanol-blocked isocyanatoethyl methacrylate.

EXAMPLE II

This example illustrates the cationic acrylic polymers of the present invention and their method of preparation.

The following were used in the preparation:

| Ingredients | Parts by Weight (in grams) |
|---|---|
| Reactor Charge | |
| 2-ethoxyethanol | 64.3 |
| Feed A | |
| 2-ethylhexanol blocked ICEMA of Example I | 57.6 |
| Hydroxyethyl methacrylate | 63.8 |
| Styrene | 80 |
| Dimethylaminoethyl methacrylate | 20 |
| VAZO 52[1] | 3 |
| Feed B | |
| VAZO 52 | 1 |
| Feed C | |
| 2-ethoxyethanol | 114.3 |

[1]2,2'-azobis(2,4-dimethylvaleronitrile) available from E. I. duPont de Nemours and Company.

The reactor charge, in a properly equipped vessel, was agitated and heated from room temperature to 122° C. over a period of 15 minutes. Then, the addition of Feed A was commenced and conducted over a period of 3 hours at a rate of 20 mls. per 15 minutes with the temperature being maintained over the range of 120°-122° C. Upon completion of the addition of Feed A and at 129° C., Feed B was added. The temperature of the reaction vessel was maintained over the range of 129°-132° C. for a period of two hours, followed by thinning with Feed C. The reaction mixture was analyzed and found to contain the acrylic polymer of the present invention containing a blocked monoisocyanato group.

EXAMPLE III

The following further illustrates the acrylic polymers of the invention, the preparation of aqueous dispersions of the acrylic polymers and their use in a cationic electrodeposition process.

The following were used in the preparation of the acrylic polymer:

| Ingredients | Parts by Weight (in grams) |
|---|---|
| Reactor Charge | |
| 2-ethoxyethanol | 39.7 |
| 10% Feed A | 21.3 |
| 10% Feed B | 3.4 |
| Deionized water | 9.0 |
| Feed A | |
| Methyl methacrylate | 62.7 |
| Styrene | 27.3 |
| Dimethylaminoethyl methacrylste | 21.8 |
| t-dodecyl mercaptan | 4.18 |
| Hydroxyethyl methacrylate | 21.8 |
| 2-ethylhexanol blocked ICEMA of Example I | 71.8 |
| Isodecyl methacrylate | 20.9 |
| Feed B | |
| 2-ethoxyethanol | 30.2 |
| VAZO 52 | 3.1 |
| Feed C | |
| 2-ethoxyethanol | 3.7 |
| VAZO 52 | 0.4 |
| Feed D | |
| 98% aqueous methane sulfonic acid | 7.83 |
| Feed E | |

| Ingredients | Parts by Weight (in grams) |
|---|---|
| Deionized water | 359.3 |

The reactor charge, in a properly equipped vessel, was heated under a nitrogen blanket from room temperature to reflux. With the removal of the nitrogen blanket and at 100° C., the addition of Feed A was commenced and conducted at a rate of 18.7 milliliters per 15 minutes concurrently with the addition of Feed B at the rate of 2.75 milliliters per 15 minutes over a period of 3 hours. After the addition of Feeds A and B and at a temperature of 104° C., the addition of Feed C was commenced and conducted at the rate of 0.5 milliliters per 15 minutes over a period of 2 hours. Upon completion of the addition of Feed C, the reaction mixture was held for one hour at a temperature of 107° C. The reaction mixture, then obtained, was analyzed and found to contain the acrylic polymer containing a blocked isocyanate.

An aqueous dispersion of the instant acrylic polymer was prepared by neutralizing the obtained acrylic polymer through the addition of Feed D and admixing the neutralized polymer with Feed E. An aqueous dispersion of 28.5 percent total solids was obtained.

The aqueous dispersion was reduced to 15 percent resin solids and then electrodeposited on substrates in the following manner.

Zinc phosphate pretreated steel was cathodically electrodeposited at 100 volts for 2 minutes at a bath temperature of 28° C. Films of appreciable thickness having excellent substrate adhesion and good wet appearance were obtained. When baked at 400° F. (204° C.) for 20 minutes, hard, solvent-resistant films were obtained, in that 100 acetone double rubs did not affect the films.

EXAMPLE IV

This example, similar to Example II, also illustrates the acrylic polymers of the present invention and their method of preparation.

The following were used in the preparation:

| Ingredients | Parts by Weight (in grams) |
|---|---|
| Reactor Charge | |
| 2-ethoxyethanol | 690.0 |
| Deionized water | 20.0 |
| Feed A | |
| Styrene | 377.5 |
| Dimethylaminoethyl methacrylate | 504.4 |
| Hydroxyethyl methacrylate | 168.0 |
| VAZO 52 | 19.5 |
| t-dodecyl mercaptan | 16.8 |
| 2-ethylhexanol blocked ICEMA of Example I | 632.2 |
| Feed B | |
| butoxyethanol | 30.0 |
| t-butyl perbenzoate | 3.36 |

EXAMPLE V

This example illustrates anionic acrylic polymers of the present invention and the aqueous dispersions derived therefrom.

The following were used in the preparation:

| Ingredients | Parts by Weight (in grams) |
|---|---|
| Reactor Charge | |
| 2-ethoxyethanol | 39.7 |
| 10% Feed A | 21.3 |
| 10% Feed B | 3.4 |
| Deionized water | 9.0 |
| Feed A | |
| Methyl methacrylate | 67.3 |
| Styrene | 48.6 |
| Isodecyl methacrylate | 20.9 |
| Hydroxyethyl methacrylate | 21.8 |
| Acrylic acid | 20.3 |
| t-dodecyl mercaptan | 4.18 |
| 2-ethylhexanol blocked ICEMA of Example I | 71.8 |
| Feed B | |
| 2-ethoxyethanol | 30.2 |
| VAZO 52 | 3.1 |
| Feed C | |
| 2-ethoxyethanol | 3.7 |
| VAZO 52 | 0.4 |
| Feed D | |
| Dimethylethanolamine | 18.8 |
| Feed E | |
| Deionized water | 722.3 |

The reactor charge was added to a reaction vessel and heated to reflux at 98° C. under a nitrogen atmosphere for about 20 minutes. The nitrogen atmosphere was then removed and Feeds A and B were added simultaneously at a uniform rate over a period of 3 hours with the temperature being maintained between 98° C. and 106° C. Upon completion of the additions of Feeds A and B, Feed C was added over a period of 2 hours with the temperature being maintained between 106°–108° C. The reaction mixture was then digested for one hour with the temperature being held at 108° C. The reaction mixture was analyzed and found to contain the acrylic polymer of the present invention, having a 69 percent resin solids content.

To prepare an aqueous dispersion, Feed D was added to neutralize the acrylic polymer and the reaction mixture was thinned with Feed E. The aqueous dispersion had a solids content of about 21.9 percent, a pH of about 7.9 and a Brookfield viscosity of 100 centipoises measured at 22° C. with No. 1 spindle at 20 revolutions per minute.

The polymer was then thinned with deionized water to 15 percent total solids. The aqueous dispersion was used for electrodeposition of zinc phosphate pretreated steel substrates at 100 volts for 2 minutes at a bath temperature of 25° C. Films having excellent substrate adhesion and good appearance were obtained. When baked at 400° F. (204° C.) for 20 minutes, hard, solvent-resistant films were obtained in that 100 acetone double rubs did not affect the films.

Therefore, what is claimed is:

1. A coating composition comprising an acrylic polymer which is prepared by polymerizing under free radical polymerization conditions a mixture of monomers comprising:
   (A) from about 5 to about 50 percent by weight of a polymerizable ethylenically unsaturated amino group-containing monomer which is an amino group-containing acrylate or methacrylate, or amino group-containing heterocylic compound having a hetero-nitrogen atom bearing a vinyl group and/or a polymerizable ethylenically unsaturated carboxylic acid group-containing monomer which is an acrylic acid, methacrylic acid, itaconic acid, crotonic acid, fumaric acid or maleic acid; the amino or carboxyl acid group is at least partially neutralized with an acid or a base;

(B) from about 5 to 85 percent by weight of a polymerizable ethylenically unsaturated blocked monoisocyanato group-containing monomer which is a blocked 2-isocyantoalkyl ester of acrylic or methacrylic acid, (C) from about 5 to 90 percent by weight of a polymerizable ethylenically unsaturated hydroxyl group-containing monomer which is a hydroxyalkyl acrylate or hydroxalkyl methacrylate; and (D) from about 0 to 85 percent by weight of at least one polymerizable ethylenically unsaturated monomer different from (a), (b) and (c) which is an alkyl acrylate or methacrylate or styrene; the percent by weight is based on the total weight of the monomers.

2. A coating composition as in claim 1, wherein the blocked 2-isocyanatoalkyl ester is a blocked 2-isocyanatoethyl methacrylate.

* * * * *